(12) United States Patent
Wendt (10) Patent No.: US 10,545,540 B2
(45) Date of Patent: Jan. 28, 2020

(54) SYSTEMS AND METHODS OF LONGITUDINAL TORSIONAL RESISTANCE IN A HINGE

(71) Applicant: Microsoft Technology Licensing, LLC, Redmond, WA (US)

(72) Inventor: Nicholas Benjamin Wendt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 183 days.

(21) Appl. No.: 15/643,099

(22) Filed: Jul. 6, 2017

(65) Prior Publication Data
US 2019/0011957 A1    Jan. 10, 2019

(51) Int. Cl.
| G06F 1/16 | (2006.01) |
| E05D 3/18 | (2006.01) |
| E05D 11/08 | (2006.01) |
| F16C 11/04 | (2006.01) |
| F16M 13/00 | (2006.01) |

(52) U.S. Cl.
CPC .............. *G06F 1/1681* (2013.01); *E05D 3/18* (2013.01); *E05D 11/082* (2013.01); *F16C 11/04* (2013.01); *F16M 13/005* (2013.01); *E05Y 2900/606* (2013.01)

(58) Field of Classification Search
CPC ....... G06F 1/1681; E05D 3/18; E05D 11/082; F16C 11/04; F16M 13/005; E05Y 2900/606
See application file for complete search history.

(56) References Cited

U.S. PATENT DOCUMENTS

| 3,555,591 A | 1/1971 | Sogoian |
| 4,190,274 A | 2/1980 | Gross et al. |
| 5,168,426 A | 12/1992 | Hoving et al. |
| 5,195,213 A | 3/1993 | Ohgami et al. |
| 5,494,447 A | 2/1996 | Zaidan |
| 6,038,739 A | 3/2000 | Katoh |
| 6,070,298 A | 6/2000 | Sorimachi |

(Continued)

FOREIGN PATENT DOCUMENTS

| CN | 205260602 U | 5/2016 |
| JP | 2015048906 A | 3/2015 |
| JP | 2015206424 A | 11/2015 |

OTHER PUBLICATIONS

"Can Microsoft's new Surface tablet replace your laptop?", http://techtalk.currys.co.uk/computing/laptops-desktops-tablets/can-microsoft-s-new-surface-tablet-replace-your-laptop/, Published on: May 21, 2014, 5 pages.

(Continued)

*Primary Examiner* — Nkeisha Smith
(74) *Attorney, Agent, or Firm* — Ray Quinney & Nebeker P.C.; Paul N. Taylor (57) ABSTRACT

A device for controlling movement of a support includes a frame, an arm, a torque element, and a link. The arm is rotatably connected to the frame about a lateral axis. The torque element is displaced from the lateral axis in a longitudinal direction perpendicular to the lateral axis. At least part of the torque element is rotatable about a longitudinal axis. The link is connected to the arm and the torque element such that rotation of the arm about the lateral axis translates at least part of the torque element in the longitudinal direction.

20 Claims, 8 Drawing Sheets

(56) References Cited

U.S. PATENT DOCUMENTS

| | | | |
|---|---|---|---|
| 6,119,310 | A | 9/2000 | Ohshima et al. |
| 7,530,142 | B2 | 5/2009 | Sutterlutti et al. |
| 8,713,757 | B2 | 5/2014 | Chen et al. |
| 9,404,298 | B1* | 8/2016 | Chen .................. G06F 1/1681 |
| 9,411,365 | B1 | 8/2016 | Tanner et al. |
| 9,483,084 | B2 | 11/2016 | Johnson et al. |
| 9,540,855 | B2 | 1/2017 | Kato |
| 9,540,856 | B2* | 1/2017 | Lin ..................... G06F 1/1681 |
| 9,549,479 | B2 | 1/2017 | Gault et al. |
| 10,037,057 | B2* | 7/2018 | Schafer ............... G06F 1/1681 |
| 10,066,429 | B2* | 9/2018 | Park ....................... E05D 1/04 |
| 10,146,270 | B2* | 12/2018 | Li ....................... G06F 1/1632 |
| 2005/0225934 | A1 | 10/2005 | Homer et al. |
| 2006/0272128 | A1 | 12/2006 | Rude |
| 2007/0186382 | A1 | 8/2007 | Huang |
| 2010/0120577 | A1 | 5/2010 | Gu et al. |
| 2010/0307872 | A1 | 12/2010 | Wheeler et al. |
| 2011/0023272 | A1 | 2/2011 | Huang |
| 2013/0068902 | A1 | 3/2013 | Huang et al. |
| 2013/0125343 | A1 | 5/2013 | Zimmer et al. |
| 2013/0221825 | A1 | 8/2013 | Bonomie et al. |
| 2013/0229773 | A1 | 9/2013 | Siddiqui et al. |
| 2014/0138507 | A1 | 5/2014 | Hennessey et al. |
| 2014/0317882 | A1 | 10/2014 | Chen et al. |
| 2014/0363245 | A1 | 12/2014 | Clark |
| 2015/0022961 | A1 | 1/2015 | Jenkins et al. |
| 2015/0121654 | A1 | 5/2015 | Novin |
| 2015/0184438 | A1 | 7/2015 | Varadarajan et al. |
| 2015/0286255 | A1 | 10/2015 | Hamel et al. |
| 2015/0309539 | A1 | 10/2015 | Kamphuis et al. |
| 2015/0346780 | A1 | 12/2015 | Leon et al. |
| 2016/0083989 | A1 | 3/2016 | Kuo |
| 2016/0153222 | A1* | 6/2016 | Hu ....................... G06F 1/1681<br>361/679.55 |
| 2016/0320811 | A1* | 11/2016 | Lin ..................... G06F 1/1681 |
| 2016/0369543 | A1* | 12/2016 | Park ..................... E05D 11/082 |
| 2017/0003719 | A1* | 1/2017 | Siddiqui ................ E05D 1/04 |
| 2017/0139446 | A1 | 5/2017 | Lan et al. |
| 2017/0208703 | A1* | 7/2017 | Lin ........................ E05F 1/1016 |
| 2017/0292302 | A1* | 10/2017 | Tomky ................. E05D 11/082 |
| 2018/0335808 | A1* | 11/2018 | Tomky .................... E05D 11/08 |

OTHER PUBLICATIONS

"Acer Aspire S7", Retrieved from: http://cdn.technomarket.bg/uploads/library/product/09125871/566eb57b12486, Jan. 17, 2017, 13 Pages.

"Non-Final Office Action Issued in U.S. Appl. No. 15/599,632", dated May 31, 2018, 11 Pages.

"International Search Report and Written Opinion Issued in PCT Application No. PCT/US18/034523", dated Aug. 10, 2018, 10 Pages.

"International Search Report and Written Opinion Issued in PCT Application No. PCT/US2018/028774", dated Jun. 25, 2018, 14 Pages.

* cited by examiner

SYSTEMS AND METHODS OF LONGITUDINAL TORSIONAL RESISTANCE IN A HINGE

CROSS-REFERENCE TO RELATED APPLICATIONS

N/A

BACKGROUND

Use of computing devices is becoming more ubiquitous by the day. Computing devices range from standard desktop computers to wearable computing technology and beyond. One area of computing devices that has grown in recent years is the hybrid and tablet computers. Many hybrid computers include input devices that may be separated from the screen. When separated from the other components, the screen may function as a table computer.

Conventional laptop computers may have a hinge between the screen and the keyboard portions of the laptop computer that supports the screen at a variety of angles between a closed position and an open position. Conventional tablet computers lack a support to hold the tablet in an upright or angled positioned. Tablet computers that include a support to hold the tablet increase a thickness of the tablet to package a hinge into the frame of the tablet computer that provides sufficient strength to support the tablet computer in a variety of positions.

SUMMARY

In some implementations, a device for controlling movement of a support includes a frame, an arm, a torque element, and a link. The arm is rotatably connected to the frame about a lateral axis. The torque element is displaced from the lateral axis in a longitudinal direction perpendicular to the lateral axis. At least part of the torque element is rotatable about a longitudinal axis. The link is connected to the arm and the torque element such that rotation of the arm about the lateral axis translates at least part of the torque element in the longitudinal direction.

In other implementations, a hinge includes a frame, an arm and a torque element that is configured to move when the arm is moved relative to the frame. The arm is rotatably connected to the frame about a lateral axis. The arm has an open position, an intermediate point, and a closed position. The torque element has an axis of rotation at a longitudinal axis that is perpendicular to the lateral axis. The torque element does more work when the arm moves between the open position and the intermediate point than between the intermediate point and the closed position.

In yet other implementations, a method of applying torque in a hinge includes rotating an arm about a lateral axis and moving a link connected to the arm. The method further includes translating a torque element in a longitudinal direction relative to a shaft, rotating the torque element about a longitudinal axis by an interaction of the torque element and the shaft, and resisting the rotation of the torque element about the longitudinal axis.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a detail view of an implementation of a hinge of the electronic device of FIG. 1 in a closed position;

FIG. 2-2 is a detail view of an implementation of a hinge of the electronic device of FIG. 1 in an open position;

FIG. 3-1 is a side cross-sectional view of another implementation of a hinge near a closed position;

FIG. 3-2 is a side cross-sectional view of the implementation of a hinge of FIG. 3-1 in an open position;

FIG. 5-1 is a bottom perspective view of another implementation of a hinge in a closed position;

FIG. 5-2 is a bottom perspective view of the implementation of a hinge of FIG. 5-1 in an open position;

DETAILED DESCRIPTION

This disclosure generally relates to devices, systems, and methods for providing a rotatable joint between two structures. More particularly, the present disclosure relates to providing a hinge with varying resistance between a closed position and an open position. In some implementations, the hinge may allow the movement of a support arm in an electronic device. The support arm and hinge may have sufficient strength support the electronic device at any angle of the support arm between the closed position and the open position while remaining movable by a user without the aid of tools.

In some implementations, a hinge according to the present disclosure may have an increased rotational resistance, a smaller overall thickness, a more progressive resistance curve, or combinations thereof relative to conventional hinges. For example, an implementation of a hinge described herein may include a longitudinally displaced frictional element that allows a smaller thickness than a conventional hinge. In other examples, an implementation of a hinge described herein may include different resistance regions depending on the rotational position of the hinge. In yet other examples, an implementation of a hinge described herein may include a camming mechanism to progressively alter the resistance of the hinge.

Figure 1:
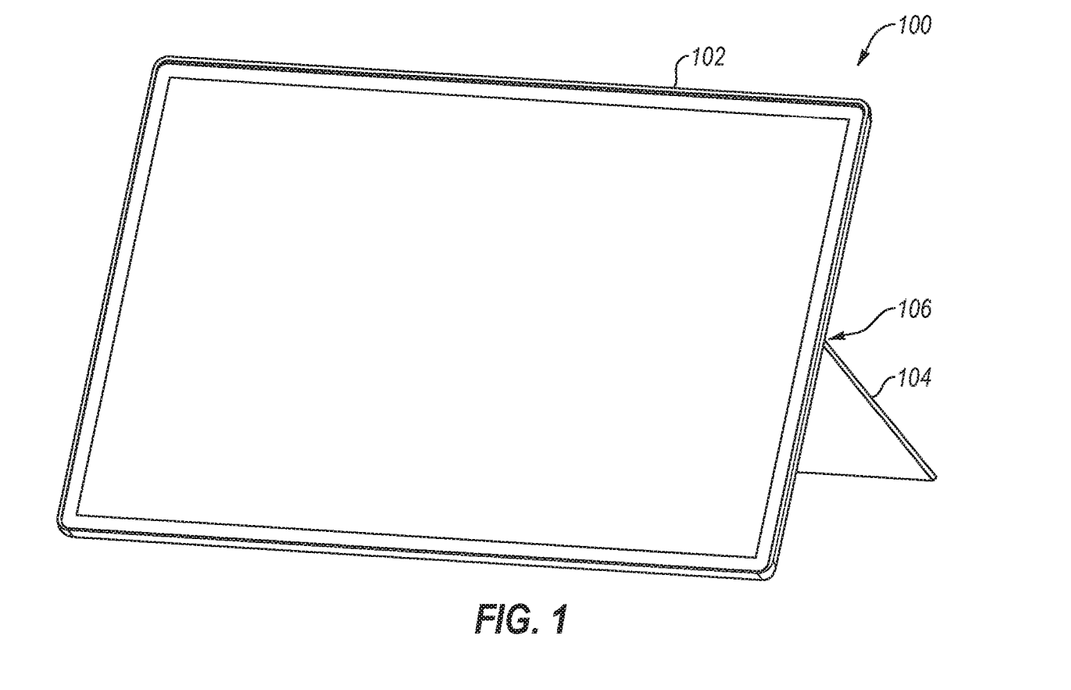
FIG. 1 is a perspective view of an implementation of an electronic device with a support arm.

FIG. 1 is a perspective view of an implementation of an electronic device 100. While the present disclosure will describe hinges in relation to a tablet and/or hybrid computer, it should be understood that various implementations of hinges described herein may be applicable to other electronic devices, such as digital picture frames, cellular telephones (i.e., smartphones), video game consoles, video-conferencing displays, electronic readers, or other electronic devices with displays. An electronic device 100 may include a frame 102. The frame 102 may be rotatably connected to a support arm 104 about a hinge 106. The hinge 106 may allow the support arm 104 to move continuously between a closed position and an open position and support the frame 102 at a continuous range of angles relative to a surface on which the electronic device 100 rests.

In conventional electronic devices with hinged support arms, the amount of force required to move the support arm 104 may be substantially constant throughout the range of movement. However, the amount of torque from the hinge 106 needed to support the electronic device 100 when the support arm 104 is positioned at a smaller angle (i.e., the hinge 106 is closer to the closed position and the electronic device 100 is nearly upright) may be less than the amount of torque needed to support the electronic device 100 when the support arm 104 is positioned at a larger angle (i.e., the hinge 106 is closer to the open position and the electronic device 100 is nearly flat). Implementations of a hinge according to present disclosure may vary the torque of the hinge relative to the position of the hinge. In other implementations, a hinge may produce a constant or near constant torque throughout the range of motion of the hinge.

Figure 21:
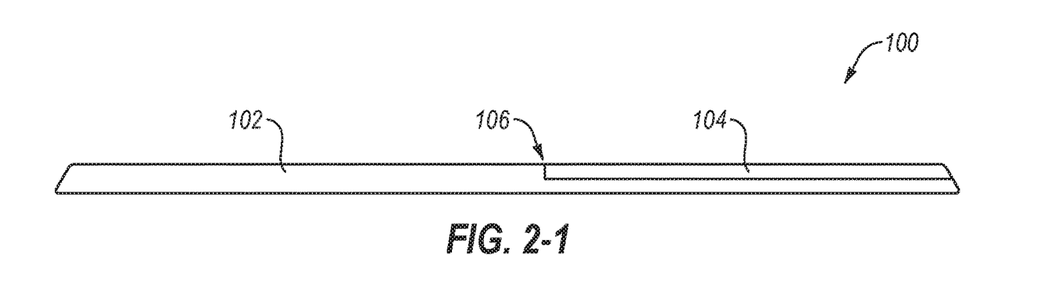
Figure 22:
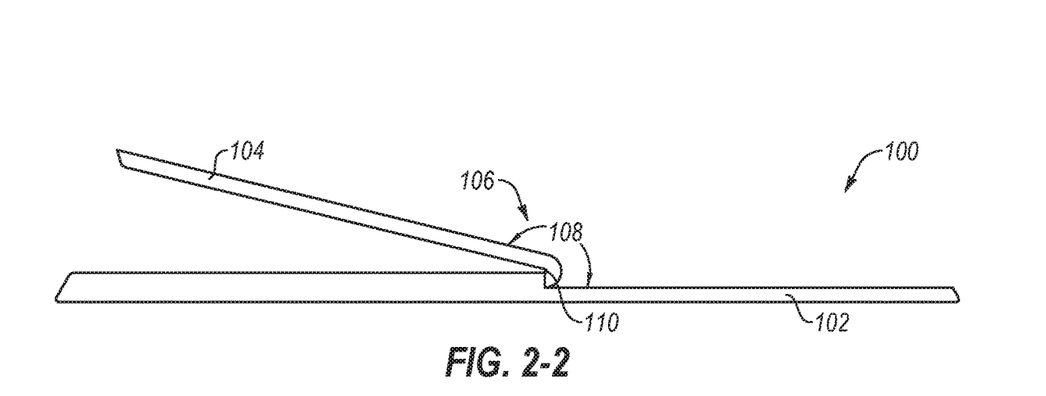

FIGS. 2-1 and 2-2 illustrate the range of movement of the implementation of a hinge 106 of FIG. 1. FIG. 2-1 is a side view of the electronic device 100 with the hinge 106 in a closed position. In the closed position, the hinge 106 allows the support arm 104 to lie parallel and/or flush with the frame 102. The hinge 106 may be continuously movable between the closed position illustrated in FIG. 2-1 and the open position illustrated in FIG. 2-2. FIG. 2-2 is a side view of the implementation of an electronic device 100 of FIG. 2-1 with a support arm 104 and hinge 106 in an open position.

An angle 108 of the hinge 106 (e.g., the angle between the frame 102 and the support arm 104) in the open position may be at least 165 degrees. The hinge 106 may be selectively positioned at any angle 108 between 0 degrees and 165 degrees and the hinge 106 may resist movement from that position. The hinge 106 may be rotatable about a lateral axis 110 of the hinge 106. In some implementations, the lateral axis 110 may be a physical axle (e.g., rod, pin, post) about which the hinge 106 rotates. In other implementations, the lateral axis 110 may be a virtual axle about which a plurality of telescoping components may move.

A lateral axis 110 with a virtual axle may allow for a smaller vertical height of the hinge 106 in a closed position. For example, a vertical height of the hinge 106 may be in a range having an upper value, a lower value, or upper and lower values including 2.0 millimeters (mm), 2.2 mm, 2.4 mm, 2.6 mm, 2.8 mm, 3.0 mm, 3.2 mm, 3.4 mm, 3.6 mm, 3.8 mm, 4.0 mm, or any values therebetween. In some examples, the vertical height in the closed position may be less than 4.0 mm. In other examples, the vertical height in the closed position may be less than 3.5 mm. In yet other examples, the vertical height in the closed position may be less than 3.0 mm.

Figure 31:
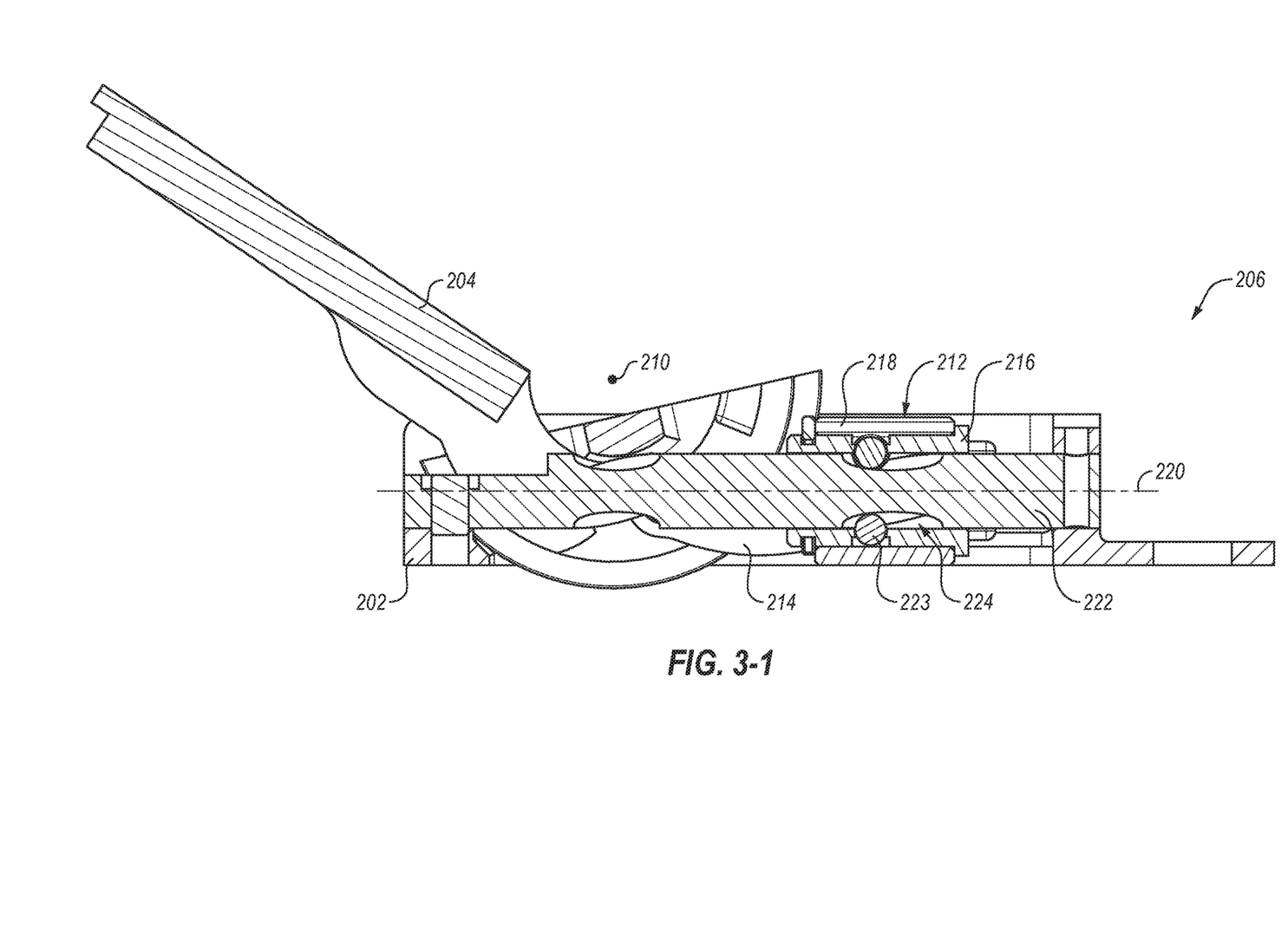
Figure 32:
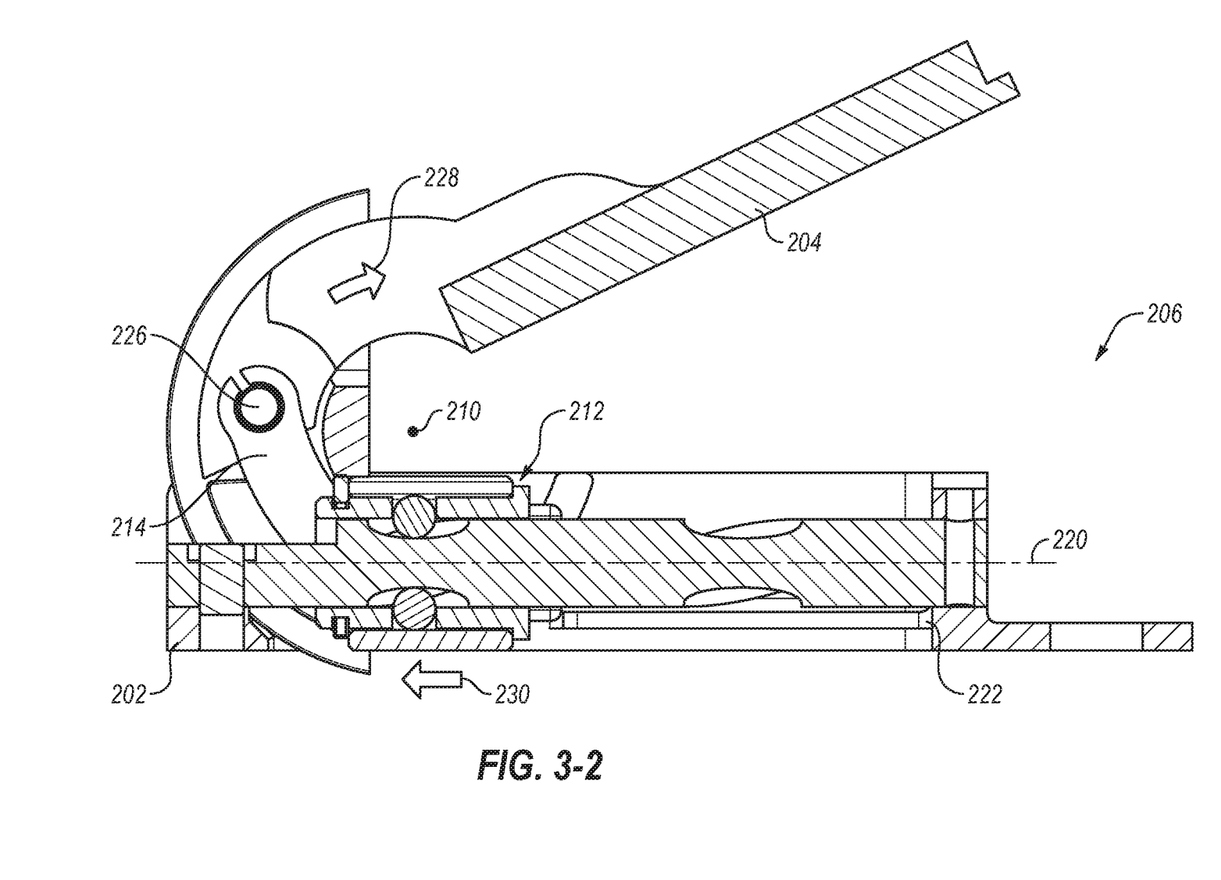

FIG. 3-1 and FIG. 3-2 illustrate an implementation of a hinge 206 with telescoping components and a progressive resistance as the hinge 206 moves between a closed position to an open position. FIG. 3-1 is a side cross-sectional view of an implementation of a hinge 206, according to the present disclosure. The hinge 206 may connect a frame 202 with an arm 204. In some implementations, the frame 202 may be the frame of an electronic device, such as the frame 102 of the electronic device 100 of FIG. 1. In other implementations, the frame 202 may be affixed to the frame of an electronic device. In some implementations, the arm 204 may be the support arm of an electronic device, such as the support arm 104 of the electronic device of FIG. 1. In other implementations, the arm 204 may be affixed to the support arm of an electronic device. In at least one implementation, the hinge 206 may be inverted and the frame 202 may be connected to a support arm of an electronic device and the arm 204 may be connected to a frame of an electronic device.

The arm 204 may rotate relative to the frame 202 about a lateral axis 210. To provide resistance to the movement of the arm 204, the hinge 206 may include a torque element 212 displaced in a longitudinal direction from the lateral axis 210 and connected to the arm 204 with a link 214. In some implementations, the torque element 212 may include a first portion 216 that rotates relative to a second portion 218 about a longitudinal axis 220. The torque element 212 may have a predetermined amount of friction between the first portion 216 and second portion 218, such that the torque element 212 resists rotation of the first portion 216 relative to the second portion 218. In at least one example, the second portion 218 may be fixed relative to part of the link 214.

The frame 202 may include a shaft 222 and/or have a shaft 222 connected thereto. The shaft 222 may at least partially limit the movement of the torque element 212 relative to the frame 202 and/or arm 204. For example, the shaft 222 may limit and/or prevent the movement of the torque element 212 in the lateral direction and/or vertical direction and may allow movement of the torque element 212 in the longitudinal direction and/or along the longitudinal axis 220. The torque element 212 may be positioned in contact with the shaft 222 and configured to interlock with at least a portion of the shaft 222. For example, the torque element 212 may be positioned around a portion of the shaft 222 and a part of the torque element 212 may interlock with a recess 224 in the shaft 222.

In some implementations, one or more bearings 223 may provide an interlock between the recess 224 in the shaft 222 and the first portion 216 of the torque element 212. In other implementations, the first portion 216 may include one or more protrusions that protrude into and interlock with the recess 224. In yet other implementations, the shaft 222 may include one or more protrusions that protrude into and interlock with a recess in the first portion 216 of the torque element 212.

The recess 224 may spiral around the shaft 222 in the longitudinal direction. The mechanical interlock of the torque element 212 and the shaft 222 may, thereby, require the rotation of the torque element 212 about the longitudinal axis 220 during linear translation of the torque element 212 relative to the shaft 222. In another example, the friction of the torque element 212 resisting a rotation of the torque element 212 may, thereby, cause the torque element 212 to resist the linear translation of the torque element 212 in the shaft 222. Additionally, a rotation of the arm 204 about the lateral axis 210 may move the link 214, which may translate the torque element 212. The friction of the rotation of the torque element 212 as the torque element 212 translates along the shaft 222, may resist the translation of the link 214 and, therefore, the rotation of the arm 204 about the lateral axis 210.

The conversion of the rotational movement of the arm 204 about the lateral axis 210 to a substantially linear movement of the torque element 212 along the shaft 222, and the subsequent conversion of the linear movement of the torque element 212 to rotational movement of the first portion 216 relative to the second portion 218 may allow for an increased rotational rate of the torque element 212 relative to the arm 204. For example, the present example converts 165 degrees of rotation of the arm 204 about the lateral axis 210 to approximately 720 degrees of rotation of the torque element 212 about the longitudinal axis 220, resulting in a gearing ratio (rotation of the torque element 212 about the longitudinal axis 220 to rotation of the arm 204 about the lateral axis 210) of about 4.5. The gearing ratio may be in a range having an upper value, a lower value, or upper and lower values including any of 1.0, 1.5, 2.0, 2.5, 3.0, 3.5, 4.0, 4.5, 5.0, 5.5, 6.0, 6.5, 7.0, 7.5, 8.0, or any values therebetween. For example, the gearing ratio may be greater than 1.0. In other examples, the gearing ratio may be less than 8.0. In yet other examples, the gearing ratio may be between 1.0 and 8.0. In further examples, the gearing ratio may be between 2.0 and 7.0. In yet further examples, the gearing ratio may be between 3.0 and 6.0.

In other implementations, the conversion of the rotational movement of the arm 204 about the lateral axis 210 to a substantially linear movement of the torque element 212 along the shaft 222 may allow for a progressive change in resistance. An initial rotational movement of the arm 204 about the lateral axis 210 may displace a portion of the link 214 in a substantially perpendicular direction relative to the longitudinal axis 220. The perpendicular movement of the link 214 relative to the longitudinal axis 220 may produce little or no linear translation of the torque element 212. For example, the substantially perpendicular movement of the link 214 relative to the longitudinal axis 220 may produce less than 0.1 mm of linear translation of the torque element 212. With little linear translation of the torque element 212 relative to the shaft 222, the torque element 212 may provide little to no resistance to the movement of the arm 204 at the closed position. The camming action of the arm 204 and link 214 described herein may allow the arm 204 to rotate about the lateral axis 210 up to 1 degree, 2 degrees, 3 degrees, 4 degrees, 5 degrees, 6 degrees, 8 degrees, or 10 degrees with less than 0.1 mm of linear translation of the torque element 212 and/or without resistance from the torque element 212.

After the initial region of perpendicular movement, the angle of the link 214 relative to the longitudinal axis 220 may increase as the rotation of the arm 204 about the lateral axis 210 increases. For example, the implementation of a hinge 206 is shown in an open position in FIG. 3-2.

As shown in FIG. 3-2, the link 214 may be rotatably coupled to the arm 204 about a connection point 226. An angle between the link 214 and the longitudinal axis 220 of the shaft 222 may increase as the arm 204 moves in a first rotational direction 228 about the lateral axis 210 and toward the open position. The force applied to the torque element 212 may, therefore, change orientation relative to the longitudinal axis 220. The total force applied by the link 214 may increase to apply a longitudinal component 230 with the same magnitude.

Figure 4:
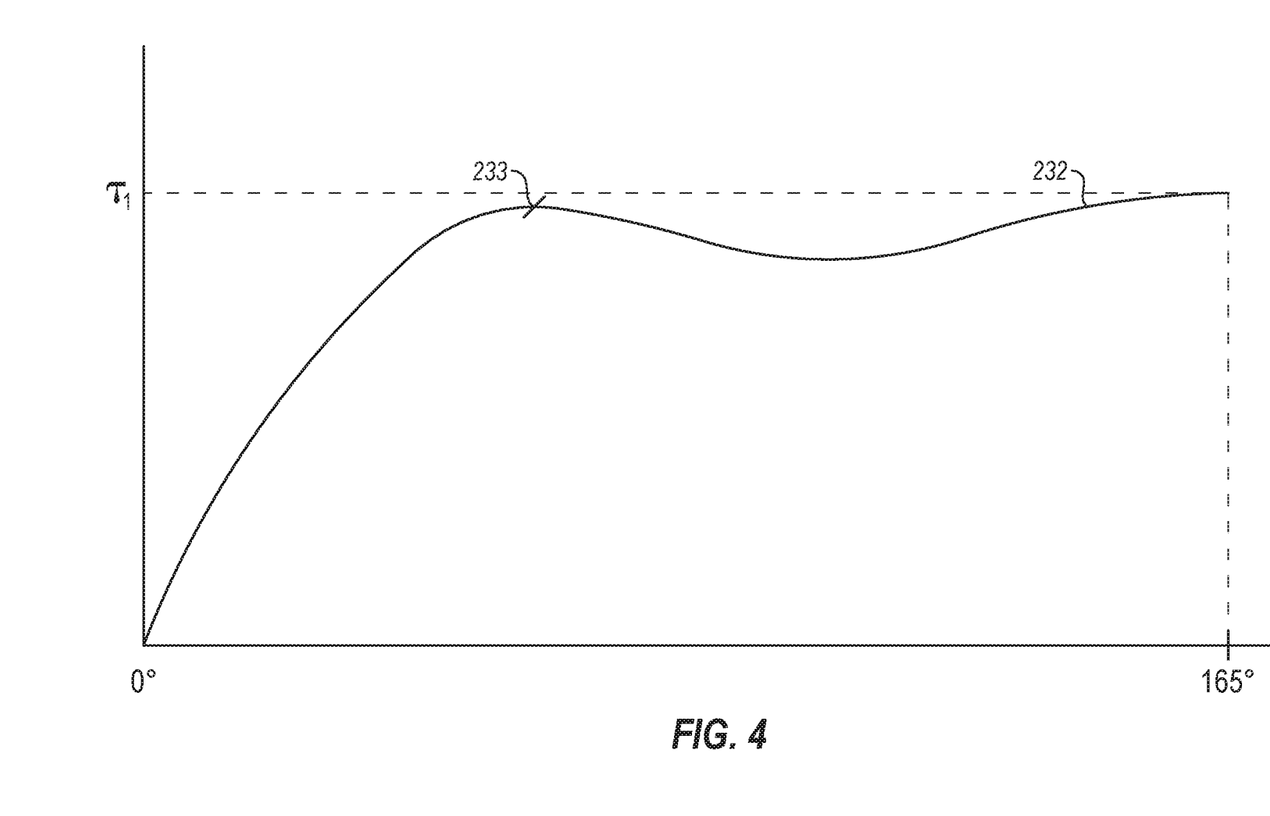
FIG. 4 is a graph of a torque curve of the implementation of a hinge of FIG. 3-1.

FIG. 4 is a graph of an example torque curve 232 of the implementation of a hinge of FIG. 3-1 and FIG. 3-2 normalized to the maximum torque. The torque curve 232 reflects the change in angle of the link as the connection point of the link and arm is pulled in an arcuate path by the arm. The torque curve 232 may increase from the closed position (at or near 0 degrees) to an intermediate point 233. The intermediate point 233 may be the point in the rotation of the arm where the link is oriented at a maximum angle relative to the longitudinal axis, and the torque curve 232 is substantially flat thereafter to the open position (at or near 165 degrees).

The torque curve 232 between the intermediate point 233 and the open position may be substantially flat. For example, the torque curve 232 may vary by less than 10% between the between the intermediate point 233 and the open position. In other examples, the torque curve 232 may vary by less than 5% between the between the intermediate point 233 and the open position. In yet other examples, the torque curve 232 may vary by less than 3% between the between the intermediate point 233 and the open position. In further examples, the torque curve 232 may vary by less than 1% between the between the intermediate point 233 and the open position.

In some implementations, the hinge may do less work between the closed position and the intermediate point 233 than between the intermediate point 233 and the open position. For example, the torque may increase from the closed position to the intermediate point 233, and the torque may be substantially constant from the intermediate point 233 to the open position. Movement from the intermediate point 233 to the open position may, therefore, require more energy input from a user to move the arm than movement from the closed position to the intermediate point 233. The intermediate point 233 (i.e., the point after which the torque is substantially constant) may be at 50 degrees from the closed position. In another example, the intermediate point 233 may be at 65 degrees from the closed position. In yet other examples, the intermediate point 233 may be between 50 degrees and 65 degrees from the closed position. In at least one example, the intermediate point 233 may be a position greater than 50 degree from the closed position.

The resistance of a hinge may be adjusted by changing the friction of the torque element and the shaft. For example, a torque element with increased resistance per degree of rotation about the rotational axis of the torque element will increase the work done as the hinge moves. For example, a hinge may produce similar resistance with a torque element that generates half the friction if the gearing ratio is doubled. In another example, a hinge according to the present disclosure may alter the resistance of the torque element depending on the position of the hinge at or between the closed position and open position.

In addition to the angle of the link to the longitudinal axis, additional elements of a hinge may be used to alter the resistance of the hinge at different longitudinal positions. For example, FIG. 5-1 and FIG. 5-2 illustrate another implementation of a hinge 306 according to the present disclosure. As with FIG. 3-1 and FIG. 3-2, in FIG. 5-1 and FIG. 5-2, the hinge 306 may include a torque element 312 displaced in a longitudinal direction (e.g., along the longitudinal axis 320) from the lateral axis 310 and connected to the arm 304 with a link 314. FIG. 5-1 is a bottom perspective view of an implementation of a hinge 306 in which the resistance of the hinge 306 includes a friction between a first portion 316 of the torque element 312 and the shaft 322.

Figure 51:
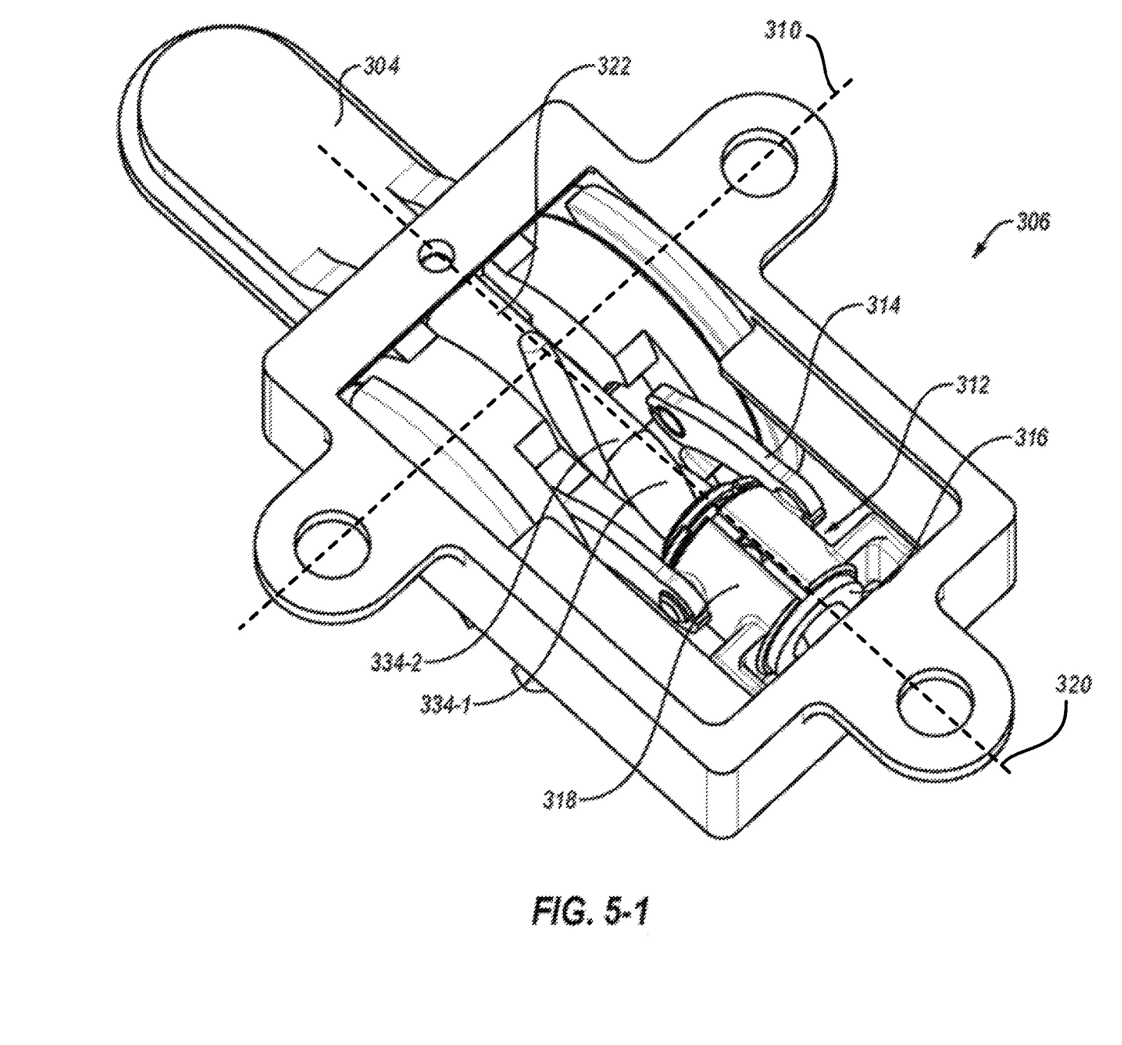

The shaft 322 may have one or more surfaces 334-1, 334-2 with one or more coefficients of friction with the first portion 316 of the torque element 312. For example, the shaft 322 may have a first surface 334-1 in a first longitudinal portion of the shaft 322 and a second surface 334-2 in a second longitudinal portion of the shaft 322. In some implementations, the division between the first surface 344-1 and the second surface 344-2 may correspond to a change in resistance. For example, the first surface 344-1 may have a lower coefficient of friction with the first portion 316 of the torque element 312 than the second surface 344-2. In other implementations, the division between the first surface 344-1 and the second surface 344-2 may correspond to the intermediate point (such as the intermediate point 233 described in relation to FIG. 4) of the arm 304.

FIG. 5-1 shows the torque element 312 in the first longitudinal portion of the shaft 322 with the first portion 316 in contact with the first surface 344-1. In some implementations, a source of resistance of the hinge 306 may be related to the friction between the first portion 316 and the shaft 322. In such implementations, the second portion 318 of the torque element 312 may surround less than a full circumference of the first portion 316. For example, the second portion 318 may have one or more openings or gaps such that the second portion 318 contacts only 50%, 60%, 70%, 80%, 90%, or less than 100% of the circumference of the first portion 316. There may be less friction between the first portion 316 and second portion 318 when compared to a first portion 316 that is continuous about the full circumference, but the height of the first portion in a vertical direction may be decreased, reducing an overall height of the hinge 306.

Figure 52:
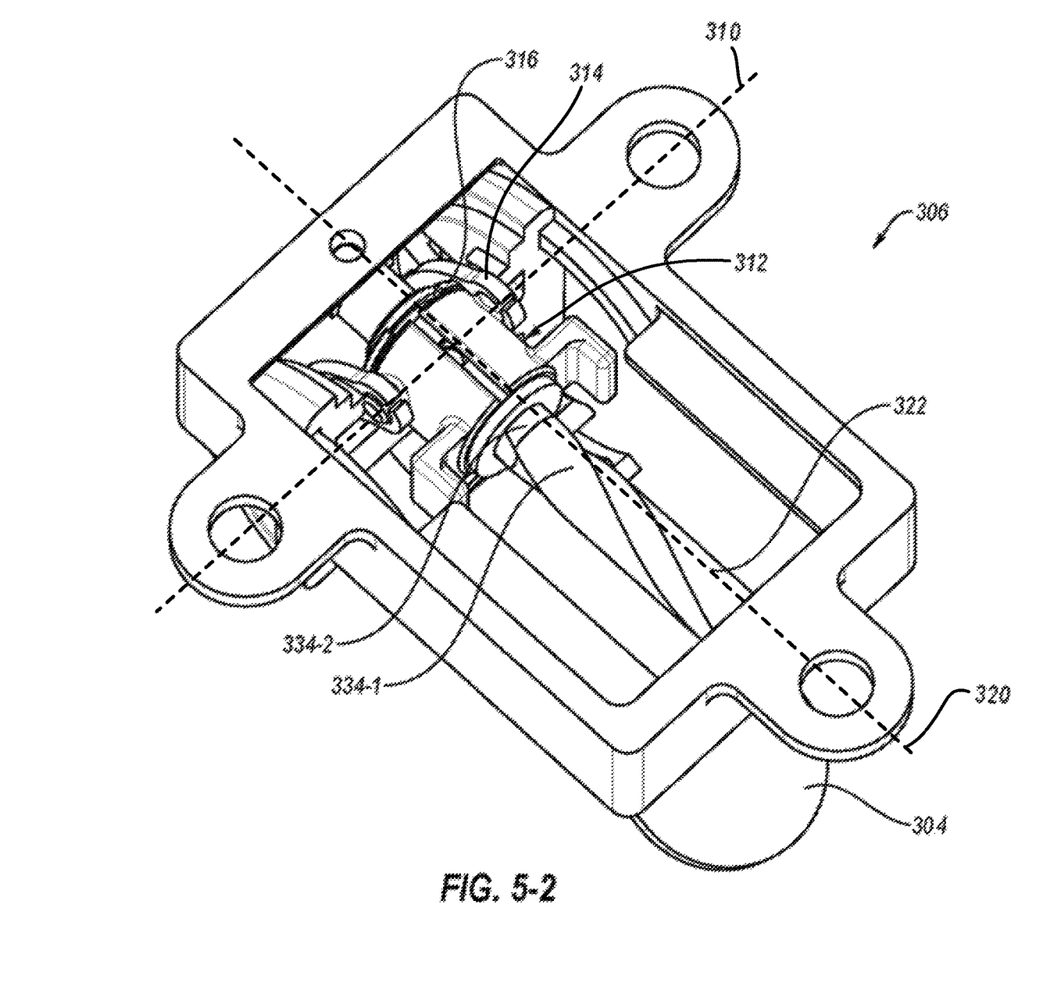

FIG. 5-2 illustrates the torque element 312 moved in a longitudinal direction along the shaft 322 as the arm 304 moves toward the open position. The torque element 312 may move from the first longitudinal portion of the shaft 322 to the second longitudinal portion and may contact the second surface 344-2. The second surface 344-2 may have a second coefficient of friction, changing the friction between the shaft 322 and the first portion 316 of the torque element 312. In some implementations, a second surface 334-2 with a greater coefficient of friction may increase the resistance of the hinge 306 as the arm 304 approaches the open position.

Figure 6:
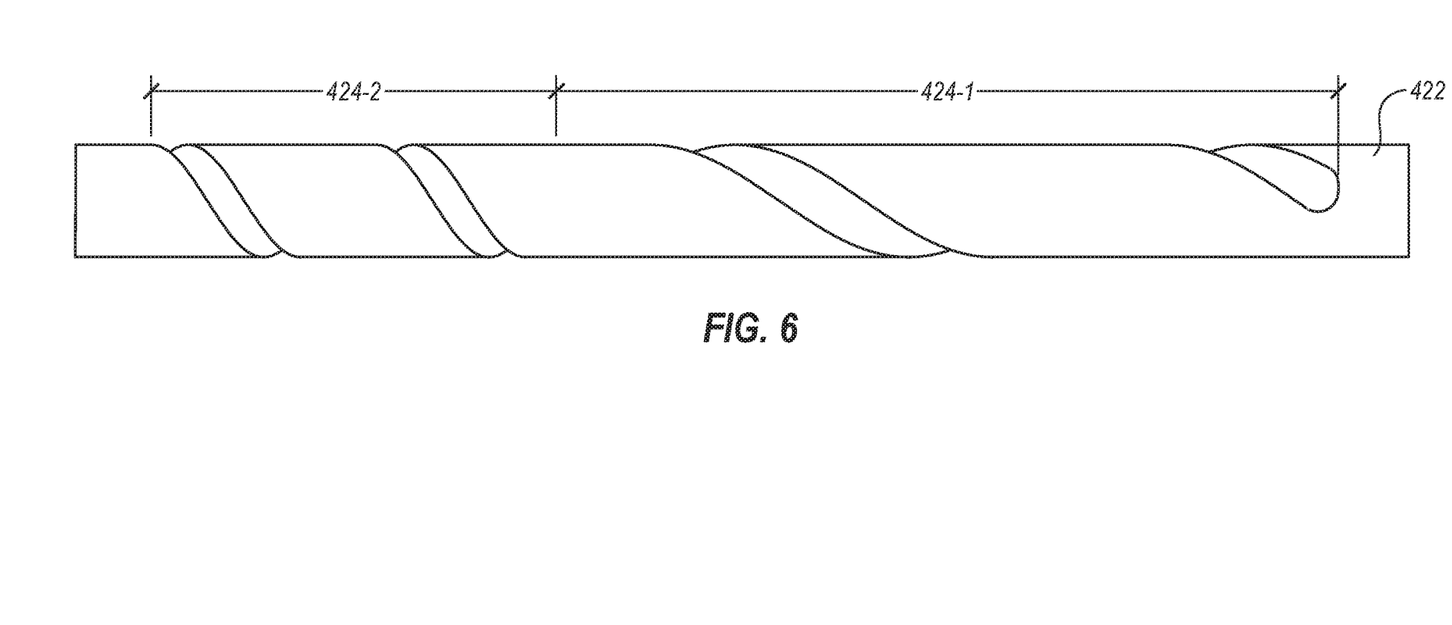
FIG. 6 is a side view of an implementation of a shaft with a varying pitch.

The resistance of the hinge may further be altered independently of the coefficient of friction by altering a pitch of the interlock between the torque element and the shaft. For example, FIG. 6 is a side view of another implementation of a shaft 422. The shaft 422 may have a recess with a first portion of the recess 424-1 with a first pitch and a second portion of the recess 424-2 with a second pitch. In some implementations, the first pitch may be less than the second pitch. In other implementations, the first pitch may be greater than the second pitch. For example, a shaft 422 with a different first pitch and second pitch may cause relative rotation of the torque element and the shaft 422 at different rates depending upon the longitudinal position of the torque element relative to the shaft 422.

In some implementations, increasing the rotational rate of the torque element relative to the longitudinal distance traveled may increase the work done given a constant friction of the torque element. In other implementations, decreasing the rotational rate of the torque element relative to the longitudinal distance traveled may decrease the work done given a constant friction of the torque element. In yet other implementations, the pitch and the friction may vary with the relative longitudinal position of the torque element and shaft.

Figure 7:
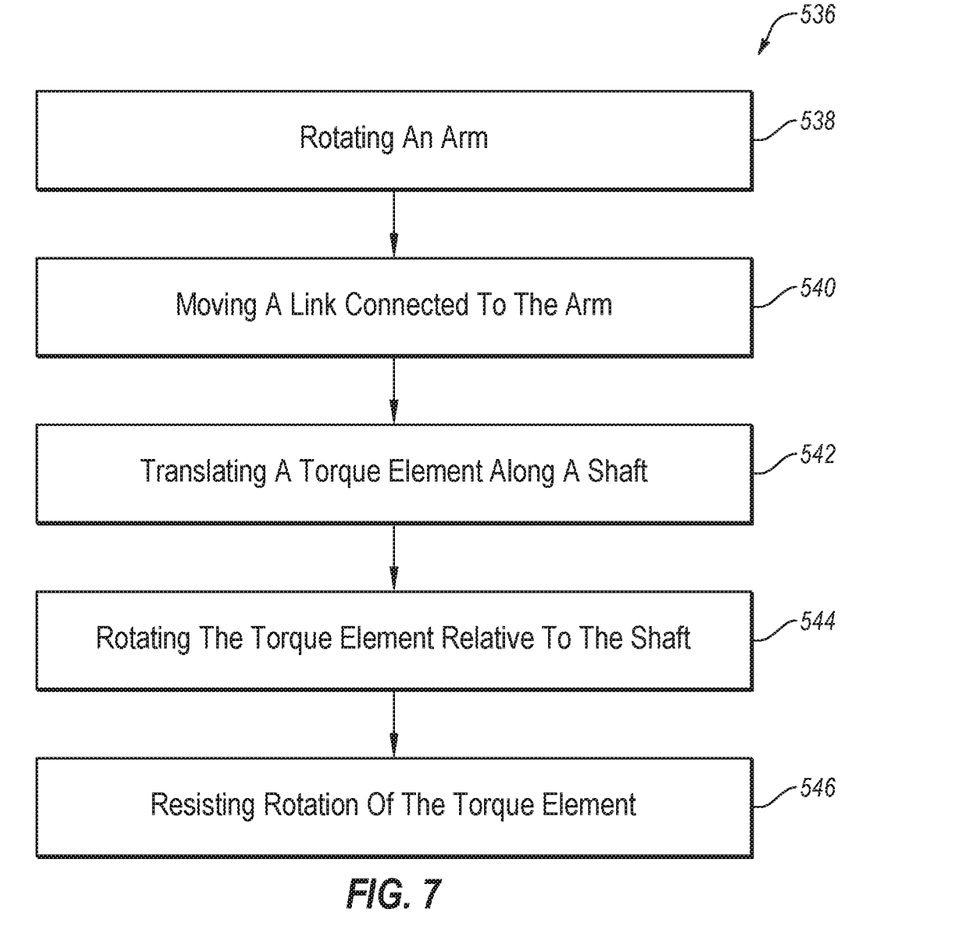
FIG. 7 is a flowchart illustrating an implementation of a method of resisting movement in a hinge.

FIG. 7 is a flowchart of an implementation of a method 536 of applying torque to a hinge, such as to support an electronic device. The method 536 may include rotating an arm about a first lateral axis at 538 and moving a link connected to the arm at 540. The link may be connected to a torque element and a movement of the link may translate the torque element relative to a shaft in a longitudinal direction at 542. The torque element may be in contact with the shaft and, the translation of the torque element along the shaft may rotate the torque element about a longitudinal axis at 544.

The shaft and the torque element may interact through interlocking features, such as a recess, a protrusion, a bearing, or other surface features. For example, an interlocking recess and bearing may limit and/or prevent the longitudinal movement of the torque element relative to the shaft without rotation of the torque element. In other examples, the shaft and the torque element may interact through friction. For example, a frictional force between the track and the torque element may limit and/or prevent the longitudinal movement of the torque element relative to the track without rotation of the torque element.

The rate of rotation of a portion of the torque element about the shaft may vary. For example, the shaft may have a first pitch and a second pitch that are different. The first pitch may rotate the portion of the torque element at a first rate and the second pitch may rotate the portion of the torque element at a second rate. In other examples, the pitch may be continuously variable such that the rate of rotation continuous changes along the longitudinal direction of the shaft. In another example, the pitch may be substantially constant along the longitudinal direction of the shaft.

The method 536 may further include resisting the rotation of the torque element about the longitudinal axis at 546. In some implementations, a first portion of the torque element may resist rotation relative to a second portion of the torque element. In other implementations, a portion of the torque element may be in contact with a portion of the shaft and may resist the rotation of the torque element relative to the track. In at least one implementation, a hinge according to the present disclosure may allow for a greater resistance and/or progressive resistance of the movement of an arm about a lateral axis.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for controlling movement of a support, the device comprising:
    a frame;
    an arm rotatably connected to the frame about a lateral axis;
    a torque element displaced from the lateral axis in a longitudinal direction perpendicular to the lateral axis, at least part of the torque element being rotatable about a longitudinal axis; and
    a link connected to the arm and the torque element such that rotation of the arm about the lateral axis translates at least part of the torque element in the longitudinal direction, wherein the longitudinal axis is transverse to the lateral axis.

2. The device of claim 1, the torque element having a first portion and a second portion, one of the first portion and second portion being rotatably fixed relative to the link.

3. The device of claim 2, the torque element being configured to resist rotation about the longitudinal axis.

4. The device of claim 2, at least one of the first portion and the second portion having a gap and extending less than a full circumference.

5. The device of claim 1, the frame having a shaft connected thereto and the torque element being positioned adjacent the shaft such that longitudinal displacement of the torque element relative to the shaft rotates a portion of the torque element.

6. The device of claim 5, the torque element positioned around the shaft.

7. The device of claim 5, the frame having a plurality of shafts connected thereto.

8. The device of claim 5, the shaft having a plurality of pitches configured to rotate a portion of the torque element at different rates depending upon a longitudinal position of the torque element relative to the shaft.

9. The device of claim 5, the shaft having a first surface with a first coefficient of friction at a first longitudinal position and a second surface with a second coefficient of friction at a second longitudinal position, the first coefficient of friction being different from the second coefficient of friction.

10. The device of claim 5, the torque element and the shaft being connected by a bearing.

11. The device of claim 1, the arm having an open position and a closed position, the arm and frame having a height of less than 4.0 millimeters in the closed position.

12. The device of claim 11, the arm and the frame forming at least a 165 degree angle in the open position.

13. A hinge, the hinge comprising:
    a frame;
    an arm rotatably connected to the frame about a lateral axis; and
    a torque element having an axis of rotation at a longitudinal axis that is perpendicular to the lateral axis such that rotation of the arm about the lateral axis translates at least part of the torque element in the longitudinal direction, wherein the arm has an open position, an intermediate point, and a closed position and the torque element does more work when the arm moves between the open position and the intermediate point than between the intermediate point and the closed position.

14. The hinge of claim 13, the torque element moving less than 0.1 mm along the longitudinal axis in up to 5 degrees of rotation of the arm about the lateral axis adjacent the closed position.

15. The hinge of claim 13, the torque element rotating about the longitudinal axis a greater amount than the arm rotates about the lateral axis while moving the arm from the closed position to the open position.

16. The hinge of claim 13, the torque element providing greater resistance to movement of the arm near the open position than near the closed position.

17. The hinge of claim 13, a torque curve of the hinge being continuous.

18. A method of applying torque in a hinge, the method comprising:
- rotating an arm about a lateral axis;
- in response to rotating the arm, moving a link connected to the arm;
- in response to moving the link, translating a torque element in a longitudinal direction relative to a shaft;
- in response to moving the link, rotating the torque element about a longitudinal axis by an interaction of the torque element and the shaft; and
- resisting the rotation of the torque element about the longitudinal axis, wherein the longitudinal axis is transverse to the lateral axis.

19. The method of claim 18, wherein rotating the arm about the lateral axis through 160 degrees causes the torque element to rotate through greater than 160 degrees.

20. The method of claim 18, wherein a rotational rate of the arm is not constant relative to a torque element rotational rate.

* * * * *